United States Patent [19]
Okazawa et al.

[11] Patent Number: 5,336,727
[45] Date of Patent: Aug. 9, 1994

[54] MALEIC ANHYDRIDE COPOLYMER

[75] Inventors: Tomoyuki Okazawa; Seiichi Tokumaru; Hideo Ohira, all of Yokkaichi; Masao Ishii, Suzuka; Yoshiaki Kano, Yokkaichi, all of Japan

[73] Assignee: Tosoh Corporation, Yamaguchi, Japan

[21] Appl. No.: 729,756

[22] Filed: Jul. 15, 1991

[30] Foreign Application Priority Data

Jul. 16, 1990 [JP] Japan ................................ 2-187495
May 9, 1991 [JP] Japan ................................ 3-133565

[51] Int. Cl.$^5$ .................. C08F 222/06; C08F 236/04; C08F 210/00
[52] U.S. Cl. ................................ 525/327.8; 526/272; 526/335; 526/348.8
[58] Field of Search ....................... 526/272; 525/327.8

[56] References Cited

U.S. PATENT DOCUMENTS

| | | | |
|---|---|---|---|
| 3,491,068 | 1/1970 | Gaylord | 260/78.5 |
| 3,553,177 | 1/1971 | Hazen et al. | 260/78.5 |
| 3,560,455 | 2/1971 | Hazen et al. | 260/78.5 |
| 3,560,456 | 2/1971 | Hazen et al. | 260/78.5 |
| 3,560,457 | 2/1971 | Hazen et al. | 260/78.5 |
| 3,729,451 | 4/1973 | Blecke et al. | 526/272 |
| 3,810,834 | 5/1974 | Jones et al. | 210/58 |
| 3,972,903 | 8/1976 | Gross | 260/346.8 |
| 4,126,549 | 11/1978 | Jones et al. | 210/58 |

FOREIGN PATENT DOCUMENTS

| | | |
|---|---|---|
| 41-11737 | of 0000 | Japan . |
| 53-20475 | 6/1978 | Japan . |
| 53-70089 | 6/1978 | Japan . |
| 5329998 | 9/1979 | Japan . |
| 60-71093 | 4/1985 | Japan . |
| 60-99334 | 6/1985 | Japan . |
| 62-132730 | 6/1987 | Japan . |

OTHER PUBLICATIONS

English Language abstract of JP 53-20475.
English Language abstract of JP 53-29998.
English Language abstract of JP 53-70089.
English Language abstract of JP 60-71093.
English Language abstract of JP 60-99334.
English Language abstract of JP 62-132730.
Patent Abstracts of Japan, Abstract of JP-A 60-71093 (Nippon Zeon K.K.).

Primary Examiner—Joseph L. Schofer
Assistant Examiner—Wu C. Cheng
Attorney, Agent, or Firm—Sughrue, Mion, Zinn, Macpeak & Seas

[57] ABSTRACT

A maleic anhydride copolymer comprising maleic anhydride units (I), conjugated diene units (II) and aliphatic monoolefin units (III) is provided. This copolymer has a weight-average molecular weight of from 500 to 50000. The molar ratio of unit (I)/(unit (II)+unit (III)) ranges from 30/70 to 90/10 and the molar ratio of unit (II)/unit (III) ranges from 5/95 to 90/10. A hydrolyzed product of the copolymer or a water-soluble maleic acid copolymer is also provided. The hydrolyzed product is advantageously used for scale inhibitors, dispersants for calcium carbonate or admixtures for cement and conctrete.

12 Claims, 3 Drawing Sheets

FIG. 3

MALEIC ANHYDRIDE COPOLYMER

BACKGROUND OF THE INVENTION

1. Field of the Invention

The present invention relates to a maleic anhydride copolymer. In particular, this invention relates to a novel copolymer comprising maleic anhydride, a conjugated diene(s) and an aliphatic monoolefin(s), a process for preparing the copolymer, hydrolyzed products of the copolymer, and applications of the hydrolyzed products to scale inhibitors, dispersants for calcium carbonate and admixtures for cement and concrete.

2. Description of the Related Art

Copolymers of maleic anhydride and olefins have been well known. U.S. Pat. No. 3,491,068 discloses copolymers maleic anhydride and a conjugated diene(s). U.S. Pat. Nos. 3,553,177, 3,560,455, 3,560,456 and 3,560,457 disclose copolymers of maleic anhydride and an α-olefin(s).

The maleic anhydride-conjugated diene copolymers are known to be used as dye-assist agents, adhesives, fire-extinguishing agents, casting mold release agents and restaining inhibitors for detergents. However, they have not been utilized as scale inhibitors, dispersants for inorganic pigment and admixtures for cement and concrete.

The maleic anhydride-α-olefin copolymers are known to be used as casting mold release agents, slip agents and floor polishes since the copolymer has good wax properties. Further, hydrolyzed products of the copolymer are known to be used as adhesives, scale inhibitors, dispersants for inorganic pigment and admixtures for cement and conctrete.

However, the hydrolyzed maleic anhydride copolymers do not show sufficient properties required for scale inhibitors, dispersants for inorganic pigment or admixtures for cement and concrete. What kind of properties are required in these applications is mentioned in detail below.

Scale inhibitors are added to cooling water of heat exchangers, water of boilers, evaporators and the like for prevention of scale formation.

Water such as natural water, tap water and industrial water contains various impurities. The impurities are cations such as calcium, magnesium, iron and barium, and anions such as carbonate ions, hydrogen carbonate ions, sulfuric acid ions and silicate ions. Occasionally, zinc ions and phosphoric acid ions are contained as corrosion inhibitors. The above water is utilized as circulating water of equipment such as heat exchangers, boilers and evaporators.

The water is often heated, cooled or concentrated, or the pit of the water is altered in the equipment. As a result, the ions contained in the water change to insoluble salts, and the salts deposit and adhere on inner walls of the equipment to form scales. The adhered scales reduce heat transfer efficiency and cooling efficiency, increase flow resistance, or cause corrosion of equipment.

In order to solve these problems, scale inhibitors are used. Previously known inhibitors are lignin compounds, phosphorus compounds, polyacrylic acid compounds and polymaleic acid compounds. Among them, the polymaleic acid compounds such as hydrolyzed products of maleic anhydride homopolymers and maleic anhydride-monoolefin copolymers are known to be relatively good scale inhibitors (see Japanese Patent Publication (KOKOKU) Nos. 53-20475 and 54-29998, and Japanese Patent (KOKAI) Nos. 53-70089 and 60-71093).

However, when the hydrolyzed product of the maleic anhydride copolymer is used in relatively low concentration, the inhibitory effect on adhesion of scales is still insufficient. Further, adhesion of scales comprising iron as a main component is not supressed by the hydrolyzed product adequately. Thus, improved scale inhibitors are required.

Among the known inhibitors, the hydrolyzed product the maleic anhydride homopolymer shows relatively good properties as mentioned above. However, the production of the homopolymer requires a large amount of polymerization initiator. The polymerization initiator is relatively expensive and, therefore, the homopolymer utilizing the initiator is also expensive.

Dispersants for inorganic pigment are important in the paper and paint industry. The dispersants are added to inorganic pigments such as calcium carbonate, titanium oxide or clay to produce a high concentration aqueous slurry in order to reduce the viscosity of the slurry (improvement in dispersibility) and suppress the rise of viscosity with time (improvement in stability of dispersibility).

A high concentration aqueous slurry containing as little water as possible and having low viscosity is preferred. This is because when white pigments such as calcium carbonate are applied on a paper, drying energy can be saved, and good coating workablity and performance are obtainable. Further, from the viewpoint of transfer and storage, an aqueous slurry with improved stability of dispersibility is necessitated since the aqueous slurry often precipitates during transer or storage to form a hard cake. Therefore, it is expected that a dispersant enables one to provide a high concentration aqueous slurry even if it is utilized in a small amount.

Condensed phosphorares such as pyrophosphorates and hexametaphosphorates, zinc salts and silicates are known as inorganic dipsersants. Salts of polycarboxylic acid such as polyacrylic acid and hydrolyzed products of maleic anhydride-isobutene coplymers are known as organic dipsersants (see Japanese Patent Disclosure (KOKAI) Nos. 60-99334 and 62-132730).

A large amount of inorganic dispersants is required to be added to an aqueous slurry because the stability of dispersibility is bad. As a result, the obtained slurry ms expensive and the coating performance is low. The organic dispersants have better properties than the inorganic ones. However, the organic ones cannot provide good dispersibility to precipitated calcium carbonate with $1\mu$ or less of particle size and are required to be improved.

Dispersants called admixtures for cement and concrete are usially added to cement mixtures to increase flowability and to improve placing workability. Cement mixtures comprise cement, water, sand and gravel. The strong cohesive force of cement particles makes the placing workability poor. In order to improve the workability, it is required to increase the water content in the cement mixture and to make the flowability high. However, the increase of water content results in a reduction of cement content in the cement mixture. This leads to lowering of strength of the hardened cement mixture.

The flowability of kneaded cement mixtures is gradually decreased due to aggregation of cement particles with the elapse of time. The kneaded cement mixtures are placed at certain intervals after kneading. However, kneaded cement mixtures are transferred to a placing site (construction site) and the intervals from kneading to placing may be widely varied due to a transfer distance and traffic jams. Therefore, the flowability of cement mixtures at the placing site is altered each time and it is hard to obtain constant workability.

Reduction of flowability with time causes another problem in the production of concrete secondary products such as piles, poles or blocks. When the transfer of kneaded cement mixture under increased pressure is interrupted and resumed after a few minutes, if the flowability of the cement mixture is lowered during the interruption, the pressure in the transfer piping is rapidly increased or piping of the transfer system is blocked.

For solution of the above mentioned problems, the admixtures for cement and concrete are used and formalin condensates of sodium naphthalene sulfonate are known (see Japanese Patent Disclosure (KOKOKU) No. 41-11737).

However, the formalin condensates of sodium naphthalene sulfonate are not a sufficient admixture. This is because good flowability provided by the condensate is not retained for a long period of time but is retained temporarily.

An object of the present invention is to provide a scale inhibitor which enables to inhibit deposition and adhesion of scale containing calcium and iron as main components even if the concentration of the inhibitor is relatively low, at which the known maleic anhydride copolymers does not function sufficiently.

Another object of the present invention is to provide a scale inhibitor which can be produced with a small amount of polymerization initiator and, as a result, is not expensive.

A still another object of the present invention is to provide a dispersant for inorganic pigments, in particular a dispersant for calcium carbonate, which offers excellent stability of dispersibility and which provides low viscosity to a high concentration slurry even if the added amount is small.

Another object of the present invention is to provide an admixture for cement and concrete which enables one to improve dispersibility of cement mixtures by suppressing physical and chemical aggregation of cement particles contained in kneaded cement mixtures.

Still another object of the present invention is to provide an admixture for cement and concrete which enables one to provide good flowability to cement mixtures and to prevent a reduction of flowability with time (slump loss).

SUMMARY OF THE INVENTION

The present invention relates to a maleic anhydride copolymer comprising units of maleic anhydride represented by formula (I):

units of at least one conjugated diene represented by formula (II):

wherein $R^1$, $R^2$, $R^3$ and $R^4$ respectively represent hydrogen or an alkyl group having 1 to 8 carbon atoms and units of at least one aliphatic monoolefin represented by formula (III):

wherein $R^5$, $R^6$, $R^7$ and $R^8$ respectively represent hydrogen or an alkyl group having 1 to 6 carbon atoms, wherein the weight-average molecular weight of the copolymer ranges from 500 to 50000, the molar ratio of unit (I)/(unit (II)+unit (III)) ranges from 30/70 to 90/10 and the molar ratio of unit (II)/unit (III) ranges from 5/95 to 90/10.

The present invention further relates to a process for preparing the copolymer comprising polymerizing maleic anhydride, at least one conjugated diene and at least one aliphatic monoolefin in the presence of at least one radical initiator wherein the conjugated diene and the monoolefin are added respectively to a mixture of maleic anhydride and at least one aromatic hydrocarbon solvent to obtain the copolymer.

The present invention also relates to hydrolyzed products of the copolymer. That is, the present invention relates to a water-soluble maleic acid copolymer comprising units of maleic acid represented by formula (VII):

wherein X and Y are the same or different and are members selected from the group consisting of hydrogen, alkali metals, alkaline earth metals, ammonium and alkyl ammonium, units of at least one conjugated diene represented by formula (II):

wherein $R^1$, $R^2$, $R^3$ and $R^4$ respectively represent hydrogen or an alkyl group having 1 to 8 carbon atoms and units of at least one aliphatic monoolefin represented by formula (III):

wherein $R^5$, $R^6$, $R^7$ and $R^8$ respectively represent hydrogen or an alkyl group having 1 to 6 carbon atoms, wherein the weight-average molecular weight of the copolymer ranges from 500 to 50000, the molar ratio of unit (VII)/(unit (II)+unit (III)) ranges from 30/70 to 90/10 and the molar ratio of unit (II)/unit (III) ranges from 5/95 to 90/10.

The present invention also relates to applications of the hydrolyzed products or the water-soluble maleic acid copolymers to scale inhibitors, dispersants for calcium carbonate and admixtures for cement and concrete.

DETAILED DESCRIPTION

In formula (II), preferably, $R^1$, $R^2$, $R^3$ and $R^4$ respectively represent hydrogen or a methyl group. The unit of conjugated diene represented by formula (II) suitably has 4 to 12 carbon atoms, 4 to 7 carbon atoms, more preferably 4 or 5 carbon atoms. Examples of the conjugated diene unit include butadiene, 1,3-pentadiene, isoprene, 1,3-hexadiene, 2,3-dimethyl-1,3-butadiene, 2-ethyl-1,3-butadiene and 1,3-heptadiene units. Particularly, butadiene and isoprene units are preferred because they have high reactivity with maleic anhydride and are easily and industrially available and cheap. Either units of a conjugated diene are contained in the copolymer or units of two or more conjugated dienes are contained.

In formula (III), preferably, $R^5$, $R^6$, $R^7$ and $R^8$ respectively represent hydrogen or an alkyl group with 1 to 3 carbon atoms. This unit suitably has 2 to 8 carbon atoms, perferably 2 to 5 carbon atoms. The units of aliphatic monoolefin represented by formula (III) are preferably α-monoolefin units. Examples of the aliphatic monoolefin unit include ethylene, propylene, 1-butene, isobutylene, 1-pentene, 1-hexene, 4-methyl-1-penetene , 1-heptene and 1-octene units. Either units of aliphatic monoolefin are contained in the copolymer or units of two or more aliphatic monoolefins are contained. In particular a hydrocarbon fraction having 4 carbon atoms obtained from thermal cracking products of naphtha is preferably used as a starting material of the chain monoolefin unit having 2 to 8 carbon atoms because it is industrially available. The hydrocarbon fraction having 4 carbon atoms contains butadiene, isobutene and 1-butene.

A narrower structure of the units of conjugated diene represented by formula (II) are units of butadiene represented by formula (IV):

and a narrower structure of the units of aliphatic monoolefin represented by formula (III) are units of isobutene represented by formula (V):

or units of 1-butene represented by formula (VI):

or both of them.

The molar ratio of the unit (I)/(unit (II)+unit (III)) ranges from 30/70 to 90/10, preferably from 40/60 to 75/25 . The molar ratio of unit (II)/unit (III) ranges from 5/95 to 90/10, preferably from 10/90 to 70/30.

The weight-average molecular weight of the copolymer ranges from 500 to 50000 , preferably from 700 to 20000. In particular, the copolymer used for scale inhibitors preferably has a 700 to 5000 weight-average molecular weight. The copolymer used for dispersants of calcium carbonate and admixtures for cement and concrete preferably has a 2000 to 20000 weight-average molecular weight.

The process for preparation of the copolymer of the present invention will be set forth below:

The copolymer of the present invention is obtained by radical copolymerization of maleic anhydride, a conjugated diene(s) and an aliphatic monoolefin(s) in a solvent in the presence of a radical initiator.

Examples of the conjugated diene include butadiene, 1,3-pentadiene, isoprene, 1,3-hexadiene, 2,3-dimethyl-1,3-butadiene, 2-ethyl-1,3-butadiene and 1,3-heptadiene. Particularly, butadiene and isoprene are preferred. Examples of the aliphatic monoolefin include ethylene, propylene, 1-butene, isobutylene, 1-pentene, 1-hexene, 4-methyl-1-penetene, 1-heptene and 1-octene. In particular, the use of the hydrocarbon fraction having 4 carbon atoms obtained from thermal cracking products of naphtha is preferred. This fraction primarily contains butadiene, isobutene and 1-butene.

At the polymerization, the conjugated diene is preferably added to a mixture of maleic anhydride and the solvent continuously. This is because if the conjugated diene is mixed with the mixture of maleic anhydride and solvent at once. a Diels-Alder reaction occurs during heating or at the beginning of the polymerization reaction and polymer yield tends to decrease. To cause the polymerization preferentially over the Dieis-Alder reaction is possible by continuously supplying the conjugated diene. Further it is preferred that the aliphatic monoolefin is continuously supplied similarly to the supply of the conjugated diene. The radical initiator may be added to the mixture of maleic anhydride and solvent in advance or may be continuously supplied to tile mixture similarly to the supply of the conjugated diene.

Examples of the solvent include hydrocarbons such as benzene, toluene, xylene and cyclohexane; ketones such as acetone, cyclohexanone and methylethylketone; esters such as ethyl acetate and isopropyl acetate; ethers such as dibutylether, tetrahydrofuran and dioxane; and dimethylsulfoxide, dimethylformamide and γ-butyrolactone. These solvents are classified into two groups, one solving maleic anhydride but not solving the copolymer, and the other solving both of maleic anhydride and the copolymer. When the former solvent is used, the polymerization reaction is in the form of either precipitation polymerization or, in the presence of a suitable dispersant, suspension polymerization. When the latter solvent is used, the polymerization is solution polymerization. A solvent such as amines and alcohols is unsuitable for the polymerization because maleic anhydride and the resulting copolymer are reacted with the solvent.

Among the above solvents, aromatic hydrocarbons are preferred because they are advantageous to the process as mentioned below. The aromatic hydrocarbons are poor solvents to the copolymer of the present invention. After the reaction, the copolymer is precipitated and obtained as a precipitant. Thus, a large portion of the solvent is easily separated by removal of supernatant. The use of the aromatic hydrocarbons is also advantageous since unreacted maleic anhydride and by-products can be removed at the same time as removal of the solvent. A small amount of the solvent remaining in the products can be removed as an azeotropic mixture with water, when a hydrolyzed product of the copolymer is prepared.

The solvents utilized are, for example, benzene; alkyl substituted-benzenes such as toluene, xylene, ethylbenzene and cumene; and halogen substituted benzenes such as chlorobenzene and bromobenzene. Benzene, toluene and xylene are preferred.

The amount of solvent used can be chosen without any restriction. It is provided that it is suitable to use from 50 to 500 part by weight of the aromatic hydrocarbons against 100 part by weight of maleic anhydride from the standpoint that a local and rapid reaction can be suppressed.

In the process described above, supplying rates of the conjugated diene, the aliphatic monoolefin and the radical initiator can be chosen without any limitation. It is provided that when precipitation polymerization is conducted by using the aromatic hydrocarbons, the supplying rate of the conjugated diene preferably complies with the following equation from the viewpoint that a Diels-Alder reaction and production of insoluble three-dimensional cross-linked polymers can be suppressed:

$$Y > 175 X + 80$$

Wherein Y represents reaction temperature (°C), and X represents the supplying rate of the conjugated diene (total moles of conjugated diene/total moles of maleic anhydride/supplying time of conjugated diene (hr)).

The supplying rates of the conjugated diene, the aliphatic monoolefin and the radical initiator may be kept constant during the polymerization reaction, or increased or decreased to control the progress of the reaction.

When the radical initiator is supplied continuously, the supplying rate thereof is chosen without any limitation. However, the generation rate of radicals is better maintained with the supply of the conjugated diene. Therefore, a supplying period of the initiator is preferably the same as that of the conjugated diene.

The radical initiator is chosen by taking into consideration its half-life. For example, when the initiator is supplied continuously, the use of a radical initiator with one hour or less of half-life at the polymerization temperature is preferred. If the half-life is too long, the amount of radicals generated in a unit time is decreased. A Dieis-Alder reaction may precede the polymerization and the yield of the copolymer may be reduced.

Examples of the radical initiator include peroxyesters such as t-butylperoxy(2-ethylhexanoate) and t-butyl peroxybenzoate; dialkylperoxides such as di-t-butylperoxide and dicumylperoxide; and peroxyketals such as 1,1-bis(t-butylperoxy)-3,3,5-trimethylcyclohexane.

It is suitable to use from 0.05 to 15 weight %, preferably 0.5 to 10 weight, % of the radical initiator to maleic anhydride. When the amount of the initiator is too small, the polymerization does not proceed effectively. When the amount is too much, the molecular weight of the copolymer tends to be small. From the viewpoint of safety and economy, the use of an excess amount of the radical initiator is not preferred.

A reaction temperature of 90% or more is preferred when the radical initiator is supplied continuously. If the temperature is less than 90° C., the weight-average molecular weight of the resulting copolymer would be higher than the desirable value or three-dimensional cross-linking easily occurs. The resulting copolymer cannot be a water soluble copolymer even if the copolymer is hydrolyzed. There is no upper limitation on the reaction temperature. It is provided that in order to control the weight-average molecualr weight of the resulting copolymer to the prescribed value, reaction temperature of 180° C. is preferred. Taking into account the weight-average molecular weight of the copolymer and a period for the reaction, the reaction temperature preferably ranges from 100° to 160° C.

It is suitable to range the reaction pressure between normal pressure and 30 kg/cm$^2$G, preferably between normal pressure and 10 kg/cm$^2$G.

The polymerization reaction can be finished when supplies of the conjugated diene and the radical initiator are completed. This is because the reaction is finished right after the completion of the supplies. It is provided that it is preferred to keep the reaction mixture under the reaction condition for a certain additional period to facilitate a consumption of unreacted monomers and radical initiator.

After completion of the reaction, the precipitated copolymer obtained by the precipitation or suspension polymerization is recovered by filtration or decantation of supernatant. If neccesary, the copolymer is washed with a poor solvent. On the other hand, in the case of solution polymerization, the reaction mixture is added to a large amount of poor solvent so that the copolymer is precipitated and recovered by filtration or decantation of supernatant.

The present invention also relates to a partial or completely hydrolyzed product of the copolymer or a water-soluble maleic acid copolymer. The hydrolyzed product is water soluble and suitably used as scale inhibitors, dispersants for calcium carbonate and admixtures for cement and concrete. In other words, regardless of the hydrolysis degree, all of water soluble hydrolyzed product is included in the present invention. Thus in this text, a hydrolyzed product includes both partially hydrolyzed product and completely hydrolyzed product of tile copolymer. That is, the water-soluble maleic acid copolymer of the present invention contains tile units of maleic acid represented by formula (VII), tile units of at least one conjugated diene represented by formula (II) and the units of at least one aliphatic monoolefin represented by formula (III), and may further contain the units of maleic anhydride represented by formula (I).

The molar ratio of unit (VII)/(unit (II)+unit (III)) ranges from 30/70 to 90/10, preferably 40/60 to 75/25. If the copolymer contain the units of maleic anhydride represented by formula (I), the molar ratio of (unit (I)+unit (VII))/(unit (II)+unit (III)) ranges from 30/70 to 90/10, preferably 40/60 to 75/25. The molar ratio of unit (VII)/unit (I) ranges from 10/90 to 100/0, preferably 30/70 to 100/0.

For the water-soluble maleic acid copolymer, the molar ratio of unit (VII)/(unit (II)+unit (III)) may range from 40/60 to 75/25 and the molar ratio of unit (II)/unit (III) may range from 10/90 to 70/30.

The copolymer recovered by filtration or decantation of supernatant is heated and refluxed with water or an aqueous alkaline compound(s) solution to obtain an aqueous solution of hydrolyzed product. Examples of the alkaline compound include compounds of alkali metal such as sodium hydroxide and potassium hydroxide, compounds of alkaline earth metal such as calcium hydroxide and barium hydroxide, ammonia, alkylamines and the like. Among them, sodium hydroxide and ammonia are preferred.

Alternatively, steam is introduced into the maleic anhydride copolymer after completion of the polymerization to remove the remaining solvent and hydrolyze the copolymer by steam distillation to obtain an aqueous solution of hydrolyzed product. The neutralization degree of the resulting aqueous solution can be changed with an alkaline compound(s) such as alkali metal compounds. In particular, when the aqueous solution is used for dispersants for calcium carbonate, it is preferred that the pH is adjusted to between neutral and weak alkaline.

The components ratio of the copolmer is determined by $^1$H-NMR and $^{13}$C-NMR or CHN elemental analysis. The existance of 1,4-structure butadiene-maleic anhydride unit, isobutene-maleic anhydride unit and 1-butene-maleic anhydride unit is identified from a spectrum of homonuclear shift correlation two dimensional NMR spectroscopy ($^1$H-COSY). Further, the existance of maleic anhydride unit is easily identified by observing absorption peaks of carbonyl arising from a cyclic acid anhydride in the vicinity of 1774 to 1780 and 1845 to 1857 $cm^{-1}$ of an IR spectrum.

The existance of the hydrolyzed maleic anhydride units or the maleic acid units in the hydrolyzed product is also identified from the results of IR specturm. In the IR spectrum of hydrolyzed product, the absorption peaks of carbonyl arising from a cyclic acid anhydride observed in the spectrum of the copolymer are weak or disappear, and a new absorption peak of carbonyl arising from a carboxyl group is observed in the vicinity of 1714 to 1722 $cm^{-1}$.

If the copolymer contains aromatic radicals generated by a chain transfer reaction of solvent, the existance of the aromatic radicals is identified from an absorption peak in the vicinity of 7.2 to 7.4 ppm of the $^1$H-NMR spectrum.

It is generally known that maleic anhydride and olefins form an alternate copolymer. From the results of FAB-MS, it can be clarified if the copolymer of the present invention contains units in which two or more maleic anhydrides neighbor.

The present invention relates to the use of the hydrolyzed product to a scale inhibitor. The scale inhibitor of the present invention contains the hydrolyzed product of the copolymer of the present invention mentioned above. An amount of the hydrolyzed product adding to water is altered according to concentration of ions contained in the water to be treated. In order to suppress adhesion of scales effectively, the amount suitably ranges, for example, from 0.1 to 100 ppm, preferably from 0.1 to 30 ppm, more preferably 1 to 20 ppm. The hydrolyzed product of the present invention enables one to prevent adhesion of scales mainly comprising calcium and iron. Also the hydrolyzed product makes it possible to prevent adhesion of scales comprising sulfates, carbonates, hydroxides, phosphates or silicates of various cations such as calcium, magnesium, barium or strontium. It is provided that the known water treatment agents may be used together with the scale inhibitors of the present invention.

The present invention also relates to the use of the hydrolyzed product as a dispersant for calcium carbonate. The dispersant for calcium carbonate of the present invention contains the hydrolyzed product of the present invention mentioned above. An amount of the hydrolyzed product added to calcium carbonate suitably ranges from 0.05 to 5 weight %, preferably from 0.1 to 2 weight %, more preferably 0.1 to 1 weight %. In the range above, an excellent dispersion effect is obtainable. An aqueous slurry of calcium carbonate can contain inorganic or organic pigments other than calcium carbonate, latexes and emulsions in addition to tile hydrolyzed product. Optionally, other dispersants or surfactants can be used together with the dispersant of the invention.

The present invention relates to the use of the hydrolyzed product in an admixture for cement and concrete. The admixture for cement and concrete of the present invention contains the hydrolyzed product of the present invention mentioned above. An amount of the hydrolyzed product added to a cement ranges from 0.05 to 3 weight %, preferably from 0.1 to 2.0 weight %. In the range above, workability of the resulting cement mixture is extremely improved. As a result, high strength is obtained due reduction of water content. In the cement using the hydrolyzed product, separation between aggregates such as sand and pebbles, and cement does not occur. The hydrolyzed product of the present invention can be used alone or together with agents such as the known admixtures for cement and concrete, air entraining agents, cure accelerators, aggregation accelerators and aggregation retardants.

Advantages of the present invention are as follows:

The scale inhibitor of the present invention effectively inhibits formation and adhesion of scale mainly comprising calcium and iron by addition thereof even if the inhibitor is used in a small amount.

A high concentration calcium carbonate aqueous slurry is provided by adding a small amount of the dispersant of the present invention to a slurry. The resulting calcium carbonate aqueous slurry has a low viscosity and high flowability, and stability thereof with the passage of time is also excellent. Thus, the slurry can be applied in the field of paper, paint or the like advantegeously.

By using the admixture for cement and concrete of the present invention, a cement mixture with improved dispersibility of cement particles and low reduction of flowability (slump loss) with the passage of time is obtainable.

EXAMPLES

The present invention will be illustrated with reference to examples but the examples are illustrative and not restrictive.

EXAMPLE 1

30 parts by weight of maleic anhydride and 48.6 parts by weight of toluene were added to an autoclave and heated to 150° C. under a nitrogen atmosphere. A mixed solution of 1. 5 parts by weight of di-t-butylperoxide and 40.6 parts by weight of toluene, and a mixed solution of 28.8 parts by weight of a hydrocarbons fraction with 4 carbon atoms (12.4 parts by weight of butadiene, 7.2 parts by weight of isobutene, 4 parts by weight of 1-butene) and 30.8 parts by weight of toluene were supplied to the autoclave respectively and continuously for 2 hours. The hydrocarbon fraction was obtained by thermal cracking of naphtha and contained 43% of butadiene. The composition of the hydrocarbons fraction is listed in Table 1. Then the reaction solution was matured at 150° C. for 1 hour and then the reaction was stopped. The resulting solution was cooled and the supernatant was removed to obtain a bulk copolymer. The yield of the copolymer was 34.7 parts by weight (yield: 65%).

The weight-average molecular weight of the resulting copolymer determined by GPC (Gel Permeation Chromatography) was 7500. The content of maleic anhydride units determined by CHN elemental analysis was about 59 mol. %. In the vicinity of 1774 to 1780 and 1845 to 1857 $cm^{-1}$ of an IR spectrum, absorption peaks of carbonyl arising from a cyclic acid anhydride were observed.

Figure 1:
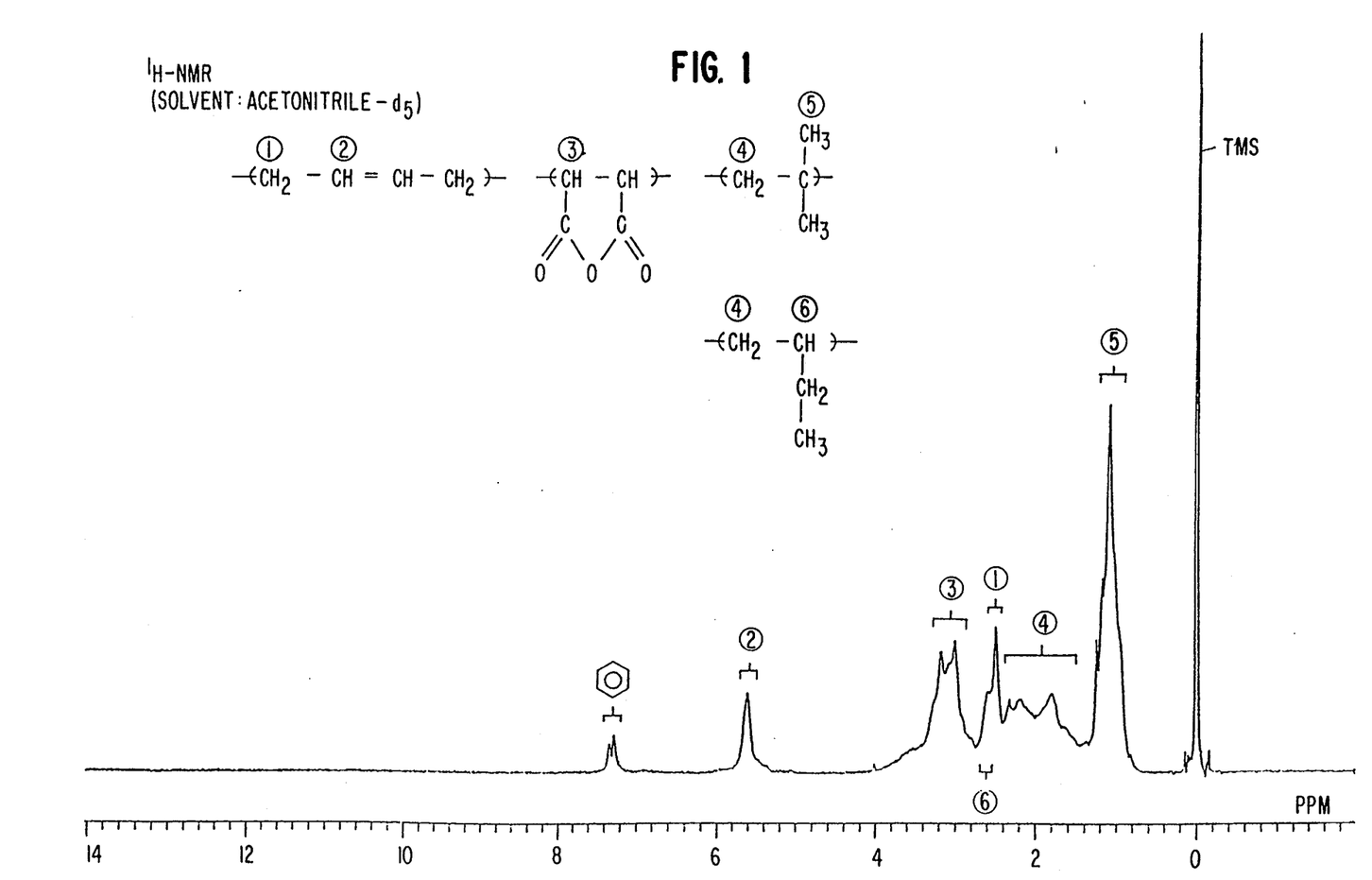
FIG. 1 illustrates a $^1$H-NMR spectrum of the maleic anhydride copolymer of the present invention.
Figure 2:
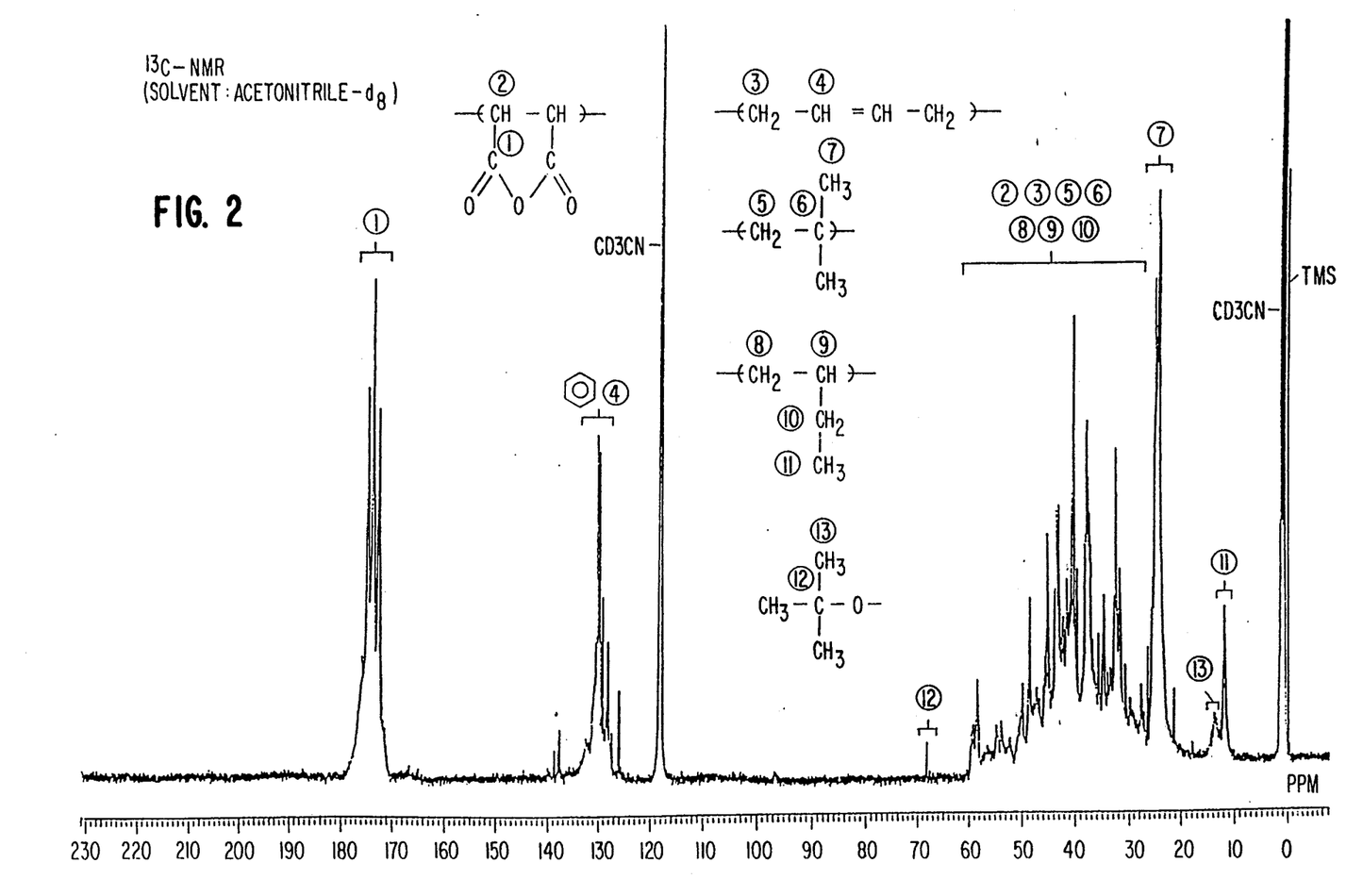
FIG. 2 illustrates a $^{13}$C-NMR spectrum of the maleic anhydride copolymer of the present invention.

Spectrums of $^1$H-NMR and $^{13}$C-MNR of the resulting copolymer are shown in FIGS. 1 and 2 respectively. The molar ratio of (maleic anhydride unit)/(olefin unit originated from butadiene)/(other olefins unit) was calculated from the ratio of peak areas in the spectrums and was 59/13/28. In the vicinity of 7.2 to 7.4 ppm of the $^1$H-NMR spectrum of FIG. 1, a peak arising from a benzyl group of aromatic solvent was observed. In the vicinity of 68 to 69 ppm of the $^{13}$C-MNR spectrum of FIG. 2, a peak arising from a tertiary carbon of a t-butoxy group of the radical initiator was observed. In the vicinity of 13 to 14 ppm of the $^{13}$C-MNR spectrum of FIG. 2, a peak arising from a primary carbon of a t-butoxy group was observed. In addition, in the spectrum of homonuclear shift correlation two dimensional NMR spectroscopy ($^1$H-COSY), 1,4-structure-butadiene/maleic anhydride unit, isobutene/maleic anhydride unit and 1-butene/maleic anhydride unit were identified.

The resulting copolymer was heated with a suitable amount of water in an autoclave equiped with a steam introducing pipe and a condenser and steam was introduced into the autoclave. From around 86° C., an azeotropic mixture of toluene and water condensed at the condenser, and the temperature rose to around 100° C., did not appear any more. Introduction of steam and condensation were continued for another 2 hours to remove toluene completely. The resulting aqueous solution was cooled to room temperature to obtain 121 parts by weight of a homogeneous aqueous copolymer solution with a 30 weight % of solid content. In the vicinity of 1714 to 1722 $cm^{-1}$ of an IR spectrum of the hydrolyzed product, an absorption peak of carbonyl arising from a carboxyl group was observed.

TABLE 1

| Component | Content (weight %) |
|---|---|
| Butadiene | 43 |
| Isobutene | 25 |
| 1-Butene | 14 |
| 2-Butene | 10 |
| Butanes/others | 8 |

EXAMPLE 2

30 parts by weight of maleic anhydride and 48.6 parts by weight of toluene were added to an autoclave and heated to 150° C. under a nitrogen atmosphere. A mixed solution of 1. 5 parts by weight of di-t-butylperoxide and 40.6 parts by weight of toluene, and a mixed solution of 19.3 parts by weight of a hydrocarbon fraction with 4 carbon atoms ( 8.3 parts by weight of butadiene, 4.8 parts by weight of isobutene, 3.7 parts by weight of 1-butene) and 40.6 parts by weight of toluene were supplied to the autoclave respectively and continuously for 4 hours. The hydrocarbon fraction was the same as that used in Example 1. Then the reaction solution was matured at 150° C. for 1 hour and the reaction was stopped. The resulting solution was cooled and the supernatant was removed to obtain a bulk copolymer. The yield of the copolymer was 34.9 parts by weight (yield: 76%).

The weight-average molecular weight of the resulting copolymer determined by GPC was 2700. The content of maleic anhydride units determined by CHN elemental analysis was about 60 mol. %. In the vicinity of 1774 to 1780 and 1845 to 1857 $cm^{-1}$ of an IR spectrum, absorption peaks of carbonyl arising from a cyclic acid anhydride were observed.

Spectrums of $^1$H-NMR and $^{13}$C-MNR of the resulting copolymer were similar to those of Example I shown in FIGS. 1 and 2. The molar ratio of maleic anhydride unit/olefin unit originated from butadiene/other olefins unit calculated from the ratio of peak areas in the spectrums was 00/12/28.

In accordance with the procedures of Example 1, the copolymer was hydrolyzed and steam distilled to obtain 122 parts by weight of a homogeneous aqueous copolymer solution with a 30 weight % solid content. In the vicinity of 1714 to 1722 $cm^{-1}$ of an IR spectrum of the hydrolyzed product, an absorption peak of carbonyl arising from a carboxyl group was observed.

EXAMPLE 3

100 parts by weight of maleic anhydride and 277 parts by weight of toluene were added to an autoclave and heated to 150° C. under a nitrogen atmosphere. A mixed solution of 5 parts by weight of di-t-butylperoxide and 79 parts by weight of toluene, and a mixed solution of 32 parts by weight of a hydrocarbons fraction of 4 carbon atoms (13.8 parts by weight of butadiene, 8 parts by weight of isobutene, 4.5 parts by weight of 1-butene) and 44 parts by weight of toluene were supplied to the autoclave respectively and continuously for 4 hours. The hydrocarbons fraction was the same as that used in Example 1. Then the reaction solution was matured at 150° C. for 1 hour and the reaction was stopped. The resulting solution was cooled and the supernatant was removed to obtain a bulk copolymer. The yield of the copolymer was 116 parts by weight (yield: 92%).

The weight-average molecular weight of the resulting copolymer determined by GPC was 1400. The content of maleic anhydride units determined by CHN elemental analysis was about 68 mol. %. In the vicinity of 1774 to 1780 and 1845 to 1857 $cm^{-1}$ of an IR spectrum, absorption peaks of carbonyl arising from a cyclic acid anhydride were observed.

Spectrums of $^1$H-NMR and $^{13}$C-MNR of the resulting copolymer were similar to those of Example 1 shown in FIGS. 1 and 2. The molar ratio of maleic anhydride unit/olefin unit originated from butadiene/other olefins unit calculated from the ratio of peak areas in the spectrums was 68/5/27.

In accordance with the procedures of Example 1, the copolymer was hydrolyzed and steam distilled to obtain 406 parts by weight of a homogeneous aqueous copolymer solution with a 30 weight % solid content. In the vicinity of 1714 to 1722 cm$^{-1}$ of an IR spectrum of the hydrolyzed product, an absorption peak of carbonyl arising from a carboxyl group was observed.

Figure 3:
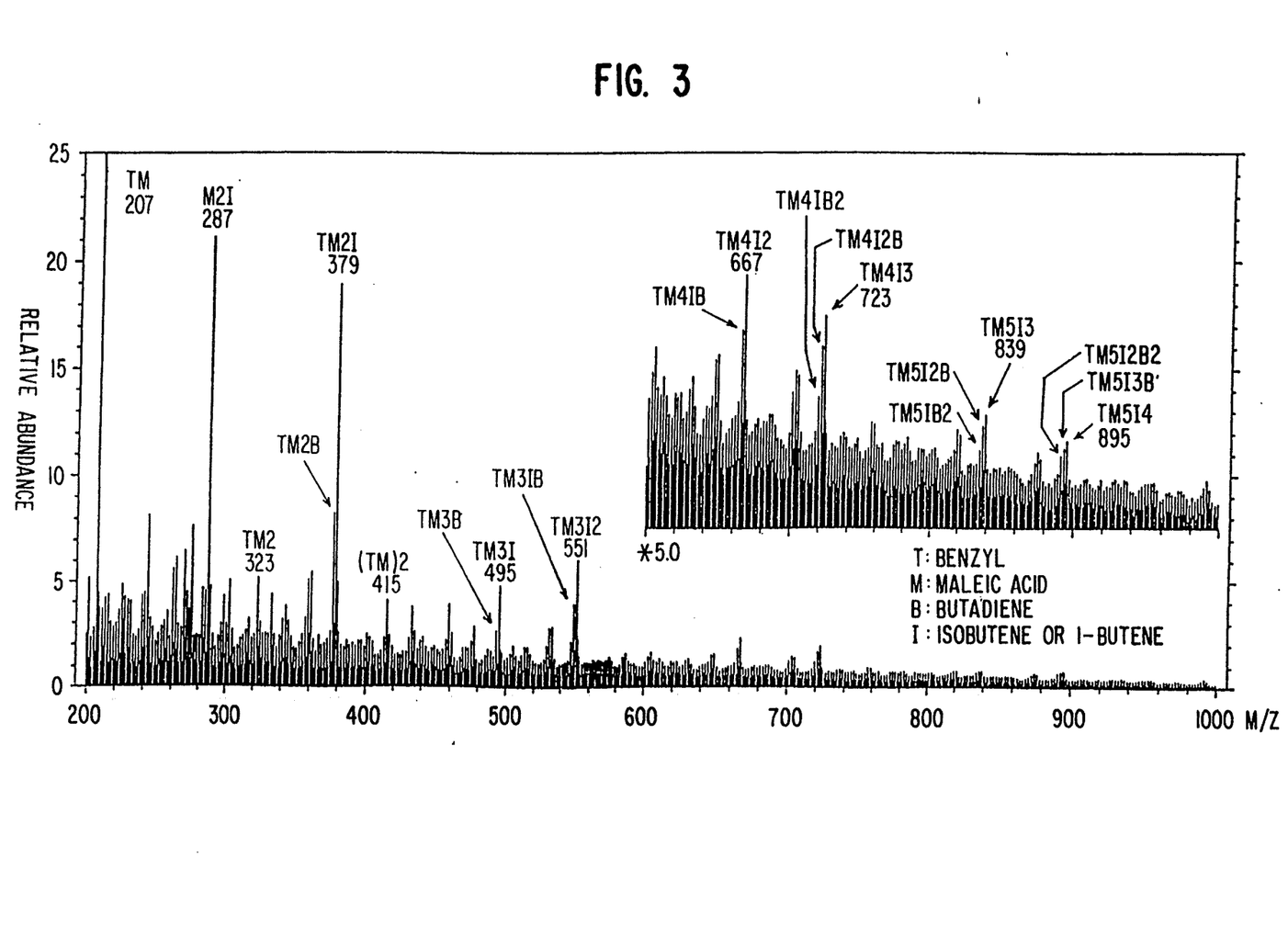
FIG. 3 illustrates a FAB-MS spectrum of the water-soluble maleic acid copolymer of the present invention.

The field of 1000 or less of molecular weight in a FAB-MA spectrum of the hydrolyzed product is shown in FIG. 3. Since existance of a benzyl group of an aromatic solvent residue was identified from the results of the $^1$H-NMR spectrum, chains of composition TM3IB, TM4IB, TM4I2B, TM4IB2, TM5I2B, TM5IB2, TM5I3B, TM5I2B2 and the like were identified. TM Composition was identified by high resolution measurement. It is provided that T represents a benzyl unit, M represents a maleic acid unit, I represents an isobutene or 1-butene unit and B represents a butadiene unit.

Example 4

125 parts by weight of maleic anhydride and 377 parts by weight of toluene were added to an autoclave and heated to 140° C. under a nitrogen atmosphere. A mixed solution of 6. 25 parts by weight of t-butylperoxybenzoate and 79 parts by weight of toluene, and a mixed solution of 120 parts by weight of a hydrocarbon fraction with 4 carbon atoms (51.6 parts by weight of butadiene, 30 parts by weight isobutene, 16.8 parts by weight of 1-butene) and 44 parts by weight of toluene were supplied to the autoclave respectively and continuously for 3 hours. The hydrocarbon fraction was the same as that used in Example 1. Then the reaction solution was matured at 140° C. for 1 hour and the reaction was stopped. The resulting solution was cooled and the supernatant was removed to obtain a bulk copolymer. The yield of the copolymer was 149 parts by weight (yield: 67%).

The weight-average molecular weight of the resulting copolymer determined by GPC was 5800. The content of maleic anhydride units determined by CHN elemental analysis was about 57 mol. %. In the vicinity of 1774 to 1780 and 1845 to 1857 cm$^{-1}$ of an IR spectrum, absorption peaks of carbonyl arising from a cyclic acid anhydride were observed.

Spectrums of $^1$H-NMR and $^{13}$C-MNR of the resulting copolymer were similar to those of Example 1 shown in FIGS. 1 and 2. The molar ratio of maleic anhydride unit/olefin unit originated from butadiene/other olefins unit calculated from the ratio of peak areas in the spectrums was 57/12/31.

In accordance with the procedures of Example 1, the copolymer was hydrolyzed and steam distilled to obtain 522 parts by weight of a homogeneous aqueous copolymer solution with a 30 weight % solid content. In the vicinity of 1714 to 1722 cm$^{-1}$ of IR spectrum of the hydrolyzed product, an absorption peak of carbonyl arising from a carboxyl group was observed.

Example 5

30 parts by weight of maleic anhydride and 48.6 parts by weight of toluene were added to an autoclave and heated to 132° C. under a nitrogen atmosphere. A mixed solution of 1. 5 parts by weight of t-butylperoxybenzoate and 40.6 parts by weight of toluene, and a mixed solution of 19.8 parts by weight of a hydrocarbons fraction with 4 carbon atoms parts by weight of butadiene, 5 parts by weight of isobutene, 2.8 parts by weight of 1-butene) and 30.8 parts by weight of toluene were supplied to the autoclave respectively and continuously for 2 hours. The hydrocarbons fraction was the same as that used in Example 1. Then the reaction solution was matured at 132° C. for 1 hour and the reaction was stopped. The resulting solution was cooled and the supernatant was removed to obtain a bulk copolymer. The yield of the copolymer was 32.8 parts by weight (yield: 71%).

The weight-average molecular weight of the resulting copolymer determined by GPC was 4200. The content of maleic anhydride units determined by CHN elemental analysis was about 61 mol. %. In the vicinity of 1774 to 1780 and 1845 to 1857 cm$^{-1}$ of an IR spectrum, absorption peaks of carbonyl arising from a cyclic acid anhydride were observed.

Spectrums of $^1$H-NMR and $^{13}$C-MNR of the resulting copolymer were similar to those of Example 1 shown in FIGS. 1 and 2. The molar ratio of maleic anhydride unit/olefin unit originated from butadiene/other olefins unit calculated from the ratio of peak areas in the spectrums was 61/11/28.

In accordance with the procedures of Example 1, the copolymer was hydrolyzed and steam distilled to obtain 115 parts by weight of a homogeneous aqueous copolymer solution with a 30 weight % solid content. In the vicinity of 1714 to 1722 cm$^{-1}$ of an IR spectrum of the hydrolyzed product, an absorption peak of carbonyl arising from a carboxyl group was observed.

EXAMPLES 6 TO 17

In accordance with the procedures of Example 1, excepting that the conditions shown in Table 2 were used, copolymers shown in Table 2 were prepared.

EXAMPLES 18 TO 20

In accordance with the procedures of Example 3, excepting that the conditions shown in Table 2 were used, copolymers shown in Table 2 were prepared.

TABLE 2

| Example | Reaction Temp. (°C.) | Ratio of added comonomers (molar ratio) | | | | Radical initiator | | | Supplying period (hr) | | Solvent | Yield (%) | Molecular weight (Mw) |
|---|---|---|---|---|---|---|---|---|---|---|---|---|---|
| | | BD/MAn | IP/MAn | IB/MAn | B1/MAn | Kind | Added Amount | Half life | Co-monomer | Initiator | | | |
| 1 | 150 | 0.75 | — | 0.42 | 0.24 | PB-D | 5.0 | 0.5 | 2.0 | 2.0 | toluene | 65 | 7500 |
| 2 | 150 | 0.50 | — | 0.28 | 0.16 | PB-D | 5.0 | 0.5 | 4.0 | 4.0 | toluene | 76 | 2700 |
| 3 | 150 | 0.25 | — | 0.14 | 0.08 | PB-D | 5.0 | 0.5 | 4.0 | 4.0 | toluene | 92 | 1400 |
| 4 | 140 | 0.75 | — | 0.42 | 0.24 | PB-Z | 5.0 | 0.21 | 3.0 | 3.0 | toluene | 67 | 5800 |
| 5 | 132 | 0.50 | — | 0.28 | 0.16 | PB-Z | 5.0 | 0.5 | 4.0 | 4.0 | toluene | 71 | 4200 |
| 6 | 130 | 0.15 | — | 0.08 | 0.05 | PB-Z | 5.0 | 0.6 | 4.0 | 4.0 | toluene | 71 | 2200 |
| 7 | 132 | 0.50 | — | 0.28 | 0.16 | PB-Z | 5.0 | 0.5 | 2.0 | 2.0 | toluene | 94 | 9300 |
| 8 | 150 | 0.75 | — | 0.42 | 0.24 | PB-D | 5.0 | 0.5 | 4.0 | 4.0 | toluene | 61 | 4300 |
| 9 | 150 | 0.50 | — | 0.28 | 0.16 | PB-D | 5.0 | 0.5 | 4.0 | 4.0 | benzen | 76 | 4500 |
| 10 | 150 | 0.50 | — | 0.28 | 0.16 | PB-D | 5.0 | 0.5 | 4.0 | 4.0 | xylene | 66 | 2100 |
| 11 | 140 | 0.50 | — | 0.28 | 0.16 | PB-D | 5.0 | 1.1 | 2.0 | 2.0 | toluene | 60 | 4100 |
| 12 | 140 | 0.50 | — | 0.28 | 0.16 | PB-D | 5.0 | 1.1 | 1.7 | 0.0 | toluene | 80 | 3600 |
| 13 | 100 | 0.25 | — | 0.14 | 0.08 | PB-O | 5.0 | 0.5 | 4.0 | 4.0 | toluene | 85 | 3900 |

TABLE 2-continued

| Example | Reaction Temp. (°C.) | Ratio of added comonomers (molar ratio) | | | | Radical initiator | | | Supplying period (hr) | | Solvent | Yield (%) | Molecular weight (Mw) |
|---|---|---|---|---|---|---|---|---|---|---|---|---|---|
| | | BD/MAn | IP/MAn | IB/MAn | B1/MAn | Kind | Added Amount | Half life | Co-monomer | Initiator | | | |
| 14 | 150 | 0.50 | — | 0.33 | — | PB-D | 5.0 | 0.5 | 2.0 | 2.0 | toluene | 62 | 2100 |
| 15 | 150 | 0.50 | — | 1.0 | — | PB-D | 5.0 | 0.5 | 2.0 | 2.0 | toluene | 67 | 5200 |
| 16 | 132 | 0.50 | — | 1.0 | — | PB-Z | 5.0 | 0.5 | 2.0 | 2.0 | toluene | 67 | 14000 |
| 17 | 120 | 0.25 | — | 1.25 | — | PH-3M | 5.0 | 0.28 | 2.0 | 2.0 | toluene | 67 | 16900 |
| 18 | 130 | 0.15 | — | 0.08 | 0.05 | PB-D | 5.0 | 5.0 | 4.0 | 4.0 | toluene | 49 | 2100 |
| 19 | 130 | 0.25 | — | 0.14 | 0.08 | PB-D | 2.0 | 5.0 | 4.0 | 4.0 | toluene | 50 | 4400 |
| 20 | 150 | 0.15 | — | 0.08 | 0.05 | PB-D | 5.0 | 0.5 | 4.0 | 4.0 | toluene | 95 | 900 |
| 21 | 150 | 0.25 | — | 0.14 | 0.08 | PB-D | 5.0 | 0.5 | 4.0 | 4.0 | toluene | 66 | 1000 |
| 22 | 135 | 0.50 | — | 0.28 | 0.16 | PB-Z | 5.0 | 0.35 | 3.0 | 3.0 | toluene | 75 | 4700 |
| 23 | 135 | 0.71 | — | 0.40 | 0.22 | PB-Z | 5.0 | 0.35 | 3.0 | 3.0 | toluene | 64 | 15700 |
| 24 | 100 | — | 0.60 | 0.40 | — | PB-O | 10.0 | 0.5 | 3.0 | 3.0 | cyclohexane | 83 | 6800 |

MAn: maleic anhydride, BD: butadiene, IP: isoprene, IB: isobutene, B1: 1-butene, PB-D: di-t-butylperoxide, PB-Z: t-butylperoxyzenzoate
PB-O: t-butylperoxy(2-ethylhexanoate), PH-3M: 1,1-bis(t-butylperoxy)-3,3,5-trimethylcylcohexane
Added amount of radical initiator: wt % (against amount of maleic anhydride), Half life: hr

EXAMPLE 21

3000 parts by weight of maleic anhydride and 25200 parts by weight of toluene were added to an autoclave and heated to 150° C. under a nitrogen atmosphere. A mixed solution of 150 parts by weight of di-t-butylperoxide and 7200 parts by weight of toluene, and a mixed solution of 960 parts by weight of a hydrocarbon fraction with 4 carbon atoms (412.8 parts by weight of butadiene, 240 parts by weight of isobutene, 34.4 parts by weight of 1-butene) and 3600 parts by weight of toluene were supplied to the autoclave respectively and continuously for 4 hours. The hydrocarbon fraction was the same as that used in Example 1. Then the reaction solution was matured at 150° C. for 1 hour and the reaction was stopped. The resulting solution was cooled and the supernatant was removed to obtain a bulk copolymer. The yield of the copolymer was 2490 parts by weight (yield: 66%).

The weight-average molecular weight of the resulting copolymer determined by GPC was 1000. The content of maleic anhydride units determined by CHN elemental analysis was about 56 mol. %.

In accordance with the procedures of Example 1, the copolymer was hydrolyzed and steam distilled to obtain 8715 parts by weight of a homogeneous aqueous copolymer solution with a 30 weight % of solid content.

EXAMPLE 22

1000 parts by weight of maleic anhydride and 7500 parts by weight of toluene were added to an autoclave and heated to 135° C. under a nitrogen atmosphere. A mixed solution of 50 parts by weight of t-butylperoxybenzoate and 1500 parts by weight of toluene, and a mixed solution of 640 parts by weight of a hydrocarbon fraction with 4 carbon atoms (275.2 parts by weight of butadiene, 160 parts by weight of isobutene, 89.6 parts by weight of 1-butene) and 3000 parts by weight of toluene were supplied to the autoclave respectively and continuously for 3 hours. The hydrocarbon fraction was the same as that used in Example 1. Then the reaction solution was matured at 135° C. for 1 hour and the reaction was stopped. The resulting solution was cooled and the supernatant was removed to obtain a bulk copolymer. The yield of the copolymer was 1143 parts by weight (yield: 75%).

The weight-average molecular weight of the resulting copolymer determined by GPC was 4700. The content of maleic anhydride units determined by CHN elemental analysis was about 47mol. %.

In accordance with the procedures of Example 1, the copolymer was hydrolyzed and steam distilled to obtain 4000 parts by weight of a homogeneous aqueous copolymer solution with a 30 weight % of solid content.

EXAMPLE 23

In accordance with the procedures of Example 22, excepting that the amount of the hydrocarbons fraction with 4 carbon atoms was changed to 915 parts by weight (393.5 parts by weight of butadiene, 228.8 parts by weight of isobutene, 128.1 parts by weight of 1-butene), a copolymer was prepared. The yield of the copolymer was 1124 parts by weight (yield: 64%).

The weight-average molecular weight of the resulting copolymer determined by GPC was 15700. The content of maleic anhydride units determined by CHN elemental analysis was about 48 mol. %.

In accordance with the procedures of Example 1, the copolymer was hydrolyzed and steam distilled to obtain 3934 parts by weight of a homogeneous aqueous copolymer solution with a 30 weight % of solid content.

EXAMPLE 24

100 parts by weight of maleic anhydride and 296 parts by weight of cyclohexanone were added to an autoclave and heated to 100° C. under a nitrogen atmosphere. A mixed solution of 10 parts by weight of t-butylperoxy(2-ethylhexanoate) and 92 parts by weight of cyclohexanone, and a mixed solution of 41.7 parts by weight of isoprene, 22.9 parts by weight of isobutene and 12 parts by weight of cyclohexanone were supplied to the autoclave respectively and continuously for 3 hours. Then the reaction solution was matured at 100° C. for 1 hour and the reaction was stopped. The resulting solution was cooled to room temperature. The reaction solution was poured into an excess amount of toluene to precipitate a copolymer. The precipitated copolymer is filtered, washed and dried to obtain 136 parts by weight of the copolymer (yield: 83%). The resulting copolymer is hydrolyzed with an aqueous sodium hydroxide solution to obtain a homogeneous aqueous copolymer solution with a 30 weight % of solid content.

TEST EXAMPLE 1

1 Test for Inhibition of Scale Adhesion 900 ml of tap water was added to a beaker and then a hydrolyzed copolymer sample or a sample on the market was added to the beaker so that the final solid concentration was 1.5 ppm or 20 ppm. Then 20 ml of an aqueous solution containing 5.88 weight % of calcium chloride 2 hydrate and 20 ml of an aqueous solution containing 0.70 weight % of Mohr's salt were added to the beaker. The pH of the resulting solution was adjusted to 8.5 with an aqueous sodium hydroxide solution and tap water was added so that the volume was 1 liter. The beaker was placed in a thermostat water bath at 40° C. A pipe-heater was dipped into the solution to be tested in the beaker and the temperature of the solution was adjusted to 60° C . After 6 hours, the amount of scales adhered on the pipe-heater was weighed. Inhibiting ratio of scale-adhesion (%) was calculated by the following equation from the amount of adhered scales. Results are listed in Table 3.

Inhibiting ratio of scale adhesion (%) = (B - A)/B × 100

A: Amount of adhered scales after the dipping test
B: Amount of adhered scales after the dipping test without inhibitor.

2 Test for Inhibition of Iron Scale Adhesion 500 ml of purified water was added to an Erlenmeyer flask and then a hydrolyzed copolymer sample or a sample on the market was added to the beaker so that the final solid concentration was 2.5 ppm. Then 10 ml of an aqueous solution containing 0.70 weight % of Mohr's salt and 10 ml of an aqueous solution containing 3.36 weight % of sodium hydrogen carbonate were added to the beaker. The pH of the resulting solution was adjusted to 8.5 with an aqueous sodium hydroxide solution and purified water was added so that the total volume was 1 liter. The beaker was sealed completely with a stopper and placed in a thermostat water bath at 40° C. for 20 hours. Then the beaker was allowed to stand and cooled to room temperature. A supernatant was collected and the iron concentration was analyzed by ICP. Inhibiting ratio of scale adhesion (%) was calculated by the following equation from the amount of adhered scales. Results are listed in Table 3.

*Inhibiting ratio of scale adhesion*
$$(\%) = (A-B)/(C-B) \times 100$$

A: Iron concentration in the supernatant after the test
B: Iron concentration in the supernatant after the test without inhibitor.
C: Iron concentration in the solution before the test.

REFERENCE EXAMPLE 1

Preparation of Hydrolyzed Copolymer Used in Test Example 1

25 parts by weight of maleic anhydride and 69 parts by weight of toluene were added to an autoclave and heated to 150° C. under a nitrogen atmosphere. A mixed solution of 0.5 parts by weight of di-t-butylperoxide and 20.5 parts by weight of toluene, and a mixed solution of 7.1 parts by weight of isobutene and 10.5 parts by weight of toluene were supplied to the autoclave respectively and continuously for 2 hours. Then the reaction solution was matured at 150 ° C. for 1 hour and the reaction was stopped. The resulting solution was cooled and the supernatant was removed. The resulting copolymer was hydrolyzed and steam distilled to obtain 73 parts by weight of a homogeneous aqueous solution of hydrolyzed copolymer with a 30 weight % solid content.

TABLE 3

| Scale inhibitor | | | MAn content | Inhibiting ratio (%) of scale adhesion | | Inhibiting ratio (%) of Iron scale adhesion (2.5 ppm) |
|---|---|---|---|---|---|---|
| Kind | Molecular weight | Composition | | 1.5 ppm | 20 ppm | |
| Example 3 | 1400 | MAn-C4 (+BD) | 68 | 60 | 78 | 100 |
| Example 18 | 2100 | MAn-C4 (+BD) | 64 | 54 | 81 | 82 |
| Example 19 | 4400 | MAn-C4 (+BD) | 57 | 54 | 73 | 94 |
| Example 20 | 900 | MAn-C4 (+BD) | 68 | 58 | 77 | 94 |
| Example 21 | 1000 | MAn-C4 (+BD) | 56 | 58 | 79 | 98 |
| Example 22 | 4700 | MAn-C4 (+BD) | 47 | 69 | 77 | 93 |
| Ref. example 1 | 1600 | MAn-isobutene | 59 | 48 | 69 | 20 |
| commercial polymaleic acid | 1200 | MAn | — | 45 | 68 | 14 |
| commercial maleic acid copolymer A | 2800 | MAn-AAE-VAc | — | 42 | 62 | 30 |
| commercial maleic acid copolymer B | 11800 | MAn-C5 | — | 35 | 69 | 10 |

MAn: maleic anhydride,
C4 (+BD): hydrocarbon fraction with 4 carbon atoms containing butadiene
AAE: acrylic acid ester, VAc: vinyl acetate,
C5: hydrocarbon fraction with 5 carbon atoms
MAn content: mol %

TEST EXAMPLE 2

Dispersion Test of Calcium Carbonate 120 parts by weight of precipitated calcium carbonate (mean particle size: 0.15μ) was added to a beaker (volume: 200 ml). Then water and a sodium salt of hydrolyzed copolymer sample or a sample on the market were added to the beaker so that solid content of calcium carbonate was 60 weight % and so that the content of the sample was 0.6 weight % against calcium carbonate weight. The resulting mixture was stirred with a homomixer (Tokushu Kika-KogyoCo., LTD., Tokyo, Japan) at 3000 rpm for 10 minutes to prepare an aqueous calcium carbonate slurry with a 60 weight % solid content. The viscosity of the slurry was measured by a B-type viscometer (Tokyo Keiki Inc., Tokyo, Japan, DLV-B type) at 25° C. at 60 rpm (rotor No. 4). Results are listed in Table 4. It is provided that the sodium salt of hydrolyzed copolymer was prepared by adjusting the pH of the aqueous hydrolyzed copolymer solution to 9 with sodium hydroxide.

REFERENCE EXAMPLE 2

Preparation of Hydrolyzed Copolymer Used in Test Example 2

25 parts by weight of maleic anhydride and 40 parts by weight of toluene were added to an autoclave and heated to 150° C. under a nitrogen atmosphere. A mixed solution of 0.25 parts by weight of di-t-butylperoxide and 33 parts by weight of toluene, and a mixed solution of 14.3 parts by weight of isobutylene and 27 parts by weight of toluene were supplied to the autoclave respectively and continuously for 4 hours. Then the reaction solution was matured at 150° C. for 1 hour and the reaction was stopped. The resulting solution was cooled and the supernatant was removed. The resulting copolymer was washed and dried to obtain 38 parts by weight of copolymer. The resultant copolymer was hydrolyzed with an aqueous sodium hydroxide solution and the pH was adjusted to 9 to obtain a homogeneous aqueous solution of hydrolyzed copolymer. Reference example 3 (Preparation of hydrolyzed copolymer used in Test example 2)

100 parts by weight of maleic anhydride and 310 parts by weight of toluene were added to an autoclave and heated to 130° C. under a nitrogen atmosphere. A mixed solution 15 parts by weight of di-t-butylperoxide and 83 parts by weight of toluene, and a mixed solution of 57.1 parts by weight of isobutylene and 7 parts by weight of toluene were supplied to the autoclave respectively and continuously for 4 hours. Then the reaction solution was matured at 130° C. for 1 hour and the reaction was stopped. The resulting solution was cooled and the supernatant was removed. The resulting copolymer was washed and dried to obtain 155 parts by weight of copolymer. The resultant copolymer was hydrolyzed with an aqueous sodium hydroxide solution and the pH was adjusted to 9 to obtain a homogeneous aqueous solution of hydrolyzed copolymer.

REFERENCE EXAMPLE 4

Preparation of Hydrolyzed Copolymer Used in Test Example 2

100 parts by weight of maleic anhydride and 200 parts by weight of toluene were added to an autoclave and heated to 140° C. under a nitrogen atmosphere. A mixed solution of 5 parts by weight of di-t-butylperoxide and 100 parts by weight of toluene, and a mixed solution of 70.8 parts by weight of styrene and 100 parts by weight of toluene were supplied to the autoclave respectively and continuously for 3 hours. Then the reaction solution was matured at 140° C. for 1 hour and the reaction was stopped. The resulting solution was cooled and the supernatant was removed. The resulting copolymer was washed and dried to obtain 158 parts by weight of copolymer. The resultant copolymer was hydrolyzed with an aqueous sodium hydroxide solution and the pH was adjusted to 9 to obtain a homogeneous aqueous solution of hydrolyzed copolymer.

TABLE 4

| | Dispersant | | | Viscosity of slurry | | |
|---|---|---|---|---|---|---|
| Kind | Molecular weight | Composition | MAn content | right after | 1 day after | 1 week after |
| Example 15 | 5200 | MAn/BD/IB | 48 | 1370 | 1260 | 1260 |
| Example 17 | 16900 | MAn/BD/IB | 47 | 550 | 930 | 950 |
| Example 22 | 4700 | MAn/C4 (+BD) | 47 | 1600 | 1410 | 1620 |
| Example 23 | 15700 | MAn/C4 (+BD) | 48 | 760 | 770 | 880 |
| Example 24 | 6800 | MAn/IP/IB | 56 | 1620 | 1590 | 1640 |
| Ref. example 2 | 6500 | MAn/IB | 48 | 4000 | 3940 | 4040 |
| Ref. example 3 | 19500 | MAn/IB | 4 | 2610 | 2600 | 2640 |
| Ref. example 4 | 6200 | MAn/ST | 59 | 2000 | 1890 | 2100 |
| Commercial salt of polyacrylic acid | 21100 | — | — | 2200 | 2010 | 2310 |

MAn: maleic anhydride, BD: butadiene, IB: isobutene, IP: isoprene
ST: styrene,
C4(+BD): hydrocarbon fraction with 4 carbon atoms containing butadiene
MAn content: mol %

TEST EXAMPLE 3

Concrete Test

Cement, water, gravel, sand and a sodium salt of hydrolyzed copolymer or formalin condensates of sodium β-naphthalene sulfonate prepared in Reference example 5 were mixed in accordance with the composition shown in Table 5 and kneaded in accordance with the method of JIS A6204. Slump, the amount of air and compression strength of the concrete composition were measured right after kneading, and after a prescribed period of time in accordance with JIS A1101, JIS A1128 and JIS A1108. Results are shown in Table 6.

It is provided that the sodium salt of hydrolyzed copolymer was prepared by adjusting the pH of aqueous solution containing a hydrolyzed copolymer to 7.3 with sodium hydroxide.

REFERENCE EXAMPLE 5

Preparation of Hydrolyzed Copolymer Used in Test Example 3

200 parts by weight of β-naphthalene sulfonate and 50 parts by weight of water were added to a reactor and heated to 90° C. 80 parts by weight of 37% formalin was supplied to the reactor for 2 hours. Then the reaction solution was kept at 100° C. for 5 hour to effect a condensation reaction. During the reaction, water was added to the reactor properly to keep the viscosity of the solution low. The total amount of added water was 100 ml. After the reaction, the resulting solution was treated with calcium hydroxide to remove free sulfonic acid and neutralized with sodium hydroxide to obtain formalin condensates of sodium β-naphthalene sulfonate.

TABLE 5

| Material | Amount | Kind |
|---|---|---|
| Cement | 12.80 kg | Onoda Normal Portland Cement |
| Water | 7.60 kg | |
| Sand | 31.12 kg | Seasand produced in Kitakyushu, Fukuoka, Japan |
| Gravel-A | 20.97 kg | Crushed stone (13 mm or more) produced in Kudamatsu, Yamaguch Japan |
| Gravel-B | 20.97 kg | Crushed stone (less than 13 mm) produced in Kudamatsu, Yamaguchi, Japan |

| | | |
|---|---|---|
| Water/Cement ratio | 59.4% | |
| Sand percent | 44.0% | |
| Intended slump | 18 ± 1 cm | |

TABLE 6

| Admixture for Cement and Concrete | Added amount (%) (solid) | Slump (cm) Right after | Slump (cm) 30 min after | Slump (cm) 60 min after | Air amount (%) Right after | Compression strength (kg/cm$^2$) 7 days | Compression strength (kg/cm$^2$) 28 days |
|---|---|---|---|---|---|---|---|
| Example 2 | 0.2 | 18.2 | 17.8 | 17.1 | 1.4 | 232 | 346 |
| Example 11 | 0.2 | 18.7 | 18.0 | 17.0 | 1.0 | 267 | 345 |
| Example 4 | 0.2 | 18.8 | 17.1 | 16.0 | 1.4 | 238 | 348 |
| Ref. Example 5 | 0.3 | 18.5 | 14.8 | 11.0 | 1.4 | 248 | 324 |

What we claim is:

1. A water-soluble maleic acid copolymer comprising units of maleic acid represented by formula (VII):

wherein X and Y are the same or different and are members selected from the group consisting of hydrogen, alkali metals, alkaline earth metals ammonium and alkyl ammoniums, units of at least one conjugated diene represnted by formula (II):

wherein $R^1$, $R^2$, $R^3$ and $R^4$ respectively represents hydrogen or an alkyl group having 1 to 8 carbon atoms, and units of at least one aliphatic monoolefin represented by formula (III):

wherein $R^5$, $R^6$, $R^7$ and $R^8$ respectively represents hydrogen or an alkyl group having 1 to 6 carbon atoms, wherein the weight-average molecular weight of the copolymer ranges from 500 to 50000, the molar ratio of unit (VII)/(unit (II) +unit (III)) ranges from 30/70 to 90/10 and the molar ratio of unit (II)/unit (III) ranges from 5/95 to 90/10.

2. A water-soluble maleic acid copolymer of claim 1 wherein the copolymer further comprising units of maleic anhydride represented by formula (I):

and the molar ratio of (unit (I)+unit (VII))/(unit (II)+unit (III)) ranges from 30/70 to 90/10.

3. A water-soluble maleic acid copolymer of claim 1 wherein $R^1$, $R^2$, $R^3$ and $R^4$ respectively represents hydrogen or a methyl group and $R^5$, $R^6$, $R^7$ and $R^8$ respectively represents hydrogen or an alkyl group having 1 to 3 carbon atoms.

4. A water-soluble maleic acid copolymer of claim 1 wherein the units of conjugated diene represnted by formula (II) are units of butadiene represented by formula (IV):

and the units of aliphatic monoolefin represented by formula (III) comprise units of isobutene represented by formula (V):

units of 1-butene represented by formula (VI):

or both of them.

5. A water-soluble maleic acid copolymer of claim 1 wherein the weight-average molecular weight ranges from 700 to 20000.

6. A water-soluble maleic acid copolymer of claim 1 wherein the molar ratio of unit (VII)/(unit (II)+unit (III)) ranges from 40/60 to 75/25 and the molar ratio of unit (II)/unit (III) ranges from 1.0/90 to 70/30.

7. A scale inhibitor comprising a water-soluble maleic acid copolymer of claim 1.

8. A scale inhibitor of claim 7 wherein the copolymer has 700 to 5000 of the weight-average molecular weight.

9. A dispersant for calcium carbonate comprising a water-soluble maleic acid copolymer of claim 1.

10. A dispersant for calcium carbonate of claim 9 wherein the copolymer has 2000 to 20000 of the weight-average molecular weight.

11. An dispersion for cement and concrete comprising a water-soluble maleic acid copolymer of claim 1.

12. An dispersion for cement and concrete of claim 11 wherein the copolymer has 2000 to 20000 of the weight-average molecular weight.

* * * * *